(12) United States Patent
    Piccone

(10) Patent No.: US 11,787,532 B2
(45) Date of Patent: Oct. 17, 2023

(54) METHOD FOR ASSISTING THE PILOTING OF A ROTORCRAFT AT HIGH ALTITUDES BY SUPPLYING MECHANICAL POWER FROM AN ELECTRICAL POWER PLANT

(71) Applicant: AIRBUS HELICOPTERS, Marignane (FR)

(72) Inventor: Jean-Francois Piccone, Cabries (FR)

(73) Assignee: Airbus Helicopters, Marignane (FR)

( * ) Notice: Subject to any disclaimer, the term of this patent is extended or adjusted under 35 U.S.C. 154(b) by 17 days.

(21) Appl. No.: 17/745,587

(22) Filed: May 16, 2022

(65) Prior Publication Data
US 2022/0380030 A1   Dec. 1, 2022

(30) Foreign Application Priority Data

May 31, 2021   (FR) ........................................ 2105685

(51) Int. Cl.
    *B64C 27/12*   (2006.01)
    *B64D 27/14*   (2006.01)
    (Continued)

(52) U.S. Cl.
    CPC .............. *B64C 27/12* (2013.01); *B64D 27/14* (2013.01); *B64D 27/24* (2013.01); *B64D 2027/026* (2013.01)

(58) Field of Classification Search
    CPC .. B64D 27/14; B64D 27/24; B64D 2027/026; B60W 20/12; B60W 20/13
    See application file for complete search history.

(56) References Cited

U.S. PATENT DOCUMENTS

| 5,847,520 A * | 12/1998 | Theurillat ................ B60K 6/46 |
|---|---|---|
| | | 903/903 |
| 7,089,744 B2 * | 8/2006 | Epstein ..................... F02C 9/18 |
| | | 60/774 |

(Continued)

FOREIGN PATENT DOCUMENTS

| FR | 2933910 A1 | 1/2010 |
|---|---|---|
| FR | 2962404 A1 | 1/2012 |

(Continued)

OTHER PUBLICATIONS

French Search Report for French Application No. FR2105685, Completed by the French Patent Office, dated Jan. 31, 2022, 8 pages.

*Primary Examiner* — Michael H Wang
(74) *Attorney, Agent, or Firm* — Brooks Kushman P.C.

(57) ABSTRACT

A method for assisting piloting beyond an altitude that can be reached with only the capabilities of a thermal power plant of a rotorcraft, by supplying power from an electrical power plant. After defining a take-off point of the rotorcraft and a target point, and their respective altitudes, a determination of a first maximum altitude that can be reached by the rotorcraft using only the thermal power plant is carried out according to a first altitude law. Then, an estimate of a second maximum altitude that can be reached by the rotorcraft using the thermal power plant and the electrical power plant jointly driving each rotor of the rotorcraft is made according to a second altitude law. If the second maximum altitude is higher than the altitude of the target point, the rotorcraft can fly to the target point.

23 Claims, 3 Drawing Sheets

(51) Int. Cl.
  *B64D 27/24* (2006.01)
  *B64D 27/02* (2006.01)

(56) References Cited

U.S. PATENT DOCUMENTS

| | | | |
|---|---|---|---|
| 2010/0013223 A1 | 1/2010 | Certain | |
| 2012/0025032 A1 | 2/2012 | Hopdjanian et al. | |
| 2012/0032637 A1* | 2/2012 | Kotooka | B60L 50/61 |
| | | | 320/109 |
| 2012/0179420 A1* | 7/2012 | Gilman | B60K 35/00 |
| | | | 702/165 |
| 2013/0192903 A1 | 8/2013 | Dubois | |
| 2013/0199204 A1 | 8/2013 | Camhi et al. | |
| 2013/0204468 A1 | 8/2013 | Camhi | |
| 2014/0013751 A1* | 1/2014 | Roggemans | B64D 27/24 |
| | | | 60/705 |
| 2014/0117148 A1 | 5/2014 | Dyrla et al. | |
| 2014/0283519 A1* | 9/2014 | Mariotto | B60K 6/48 |
| | | | 60/698 |
| 2015/0134174 A1* | 5/2015 | Preece | H01M 10/44 |
| | | | 701/22 |
| 2016/0167642 A1* | 6/2016 | Debert | B60W 20/12 |
| | | | 180/65.265 |
| 2017/0072804 A1* | 3/2017 | De Miranda | B60L 53/68 |
| 2017/0210481 A1* | 7/2017 | Bak | B64D 35/02 |
| 2017/0225794 A1* | 8/2017 | Waltner | F01D 13/00 |
| 2017/0274888 A1* | 9/2017 | Suzuki | B60K 6/445 |
| 2018/0009542 A1* | 1/2018 | Kuster | B64D 31/06 |
| 2018/0372535 A1 | 12/2018 | Bailly et al. | |
| 2020/0031481 A1* | 1/2020 | Gazzino | B64C 19/02 |
| 2020/0172224 A1 | 6/2020 | Gazzino | |
| 2020/0277080 A1* | 9/2020 | Wiegman | B60L 50/60 |

FOREIGN PATENT DOCUMENTS

| | | |
|---|---|---|
| FR | 2986322 A1 | 8/2013 |
| FR | 2986506 A1 | 8/2013 |
| FR | 2986507 A1 | 8/2013 |
| FR | 2993243 A1 | 1/2014 |
| FR | 2997382 A1 | 5/2014 |
| FR | 3003514 A1 | 9/2014 |
| FR | 3039614 A1 | 2/2017 |
| FR | 3068004 A1 | 12/2018 |
| FR | 3084318 A1 | 1/2020 |
| FR | 3089205 A1 | 6/2020 |
| FR | 3092926 A1 | 8/2020 |

* cited by examiner

METHOD FOR ASSISTING THE PILOTING OF A ROTORCRAFT AT HIGH ALTITUDES BY SUPPLYING MECHANICAL POWER FROM AN ELECTRICAL POWER PLANT

CROSS REFERENCE TO RELATED APPLICATIONS

This application claims priority to French patent application No. FR 21 05685 filed on May 31, 2021, the disclosure of which is incorporated in its entirety by reference herein.

TECHNICAL FIELD

The present disclosure relates to the field of high-altitude rotorcraft flights.

The present disclosure relates to a method for assisting the piloting of a rotorcraft at high altitudes by supplying power from an electrical power plant of a hybrid power plant, and to a rotorcraft provided with a hybrid power plant and configured to implement this method.

BACKGROUND

A rotorcraft is conventionally provided with a fuselage and at least one main rotor for at least contributing to the lift, and also the propulsion, of the rotorcraft. A rotorcraft may also comprise an auxiliary rotor capable of opposing the torque induced by the rotation of the main rotor on its fuselage.

A rotorcraft may also comprise one or more propellers generating thrust to provide at least part of the propulsion of the rotorcraft, and also capable of opposing the torque induced by the rotation of the main rotor on the fuselage.

For reasons of simplification, the term "rotor" is used hereinafter to refer either a main rotor, an auxiliary rotor or a propeller of the rotorcraft.

A rotorcraft also comprises a power plant provided with a mechanical transmission channel and at least one engine. The mechanical transmission channel is mechanically connected to the engine or engines and to the rotor or rotors of the rotorcraft. As a result, the power plant rotates the rotor or rotors of the rotorcraft.

A power plant comprises one or more heat engines, also referred to as "combustion engines", such as a piston engine or a gas turbine.

Furthermore, the flight envelope of a rotorcraft is limited by the aerodynamic limits of the rotorcraft and by the performance of its power plant. The performance of heat engines is in particular influenced by the atmospheric pressure and the outside air temperature. As a result, the maximum altitude that can be reached by the rotorcraft depends, in particular, on the total mass of the rotorcraft, the atmospheric pressure and the outside air temperature.

Indeed, the atmospheric pressure and the outside air temperature decrease as the altitude increases. The reduction in atmospheric pressure as the altitude increases then leads to a drop in performance of the heat engine. Therefore, for a rotorcraft equipped solely with one or more heat engines, the heat engine or engines of the rotorcraft no longer make it possible, on their own, to provide the rotorcraft with a positive rate of climb beyond a certain altitude, referred to as the "maximum altitude that can be reached", and the rotorcraft can no longer increase its altitude.

This maximum altitude that can be reached is, for example, indicated on charts for a given rotorcraft with a given power plant, depending on the total mass of the rotorcraft as well as the atmospheric pressure and the temperature of the air outside the rotorcraft.

Moreover, the performance of a heat engine also varies depending on an ageing state of the heat engine, i.e., depending on how long it has been used for and the manner in which it has been used and damaged.

This ageing state of a heat engine of a rotorcraft may be determined, for example, by measuring parameters of this heat engine while it is operating, for example during a flight. For example, documents FR 2 986 506 and FR 2 986 507 describe such methods for determining the ageing state of a heat engine, which can be referred to as "methods for checking the health of an engine".

However, in order to be applicable throughout the whole life of the heat engine, namely from the new state to the aged state, the flight envelope of the rotorcraft equipped with this engine, and in particular the maximum altitude that can be reached, is determined based on the performance of the rotorcraft in the aged state. Consequently, this flight envelope is generally minimized in comparison with the actual capabilities of the rotorcraft, but is reassuring because it is valid even when the heat engine reaches the aged state.

In this context, an object of the present disclosure is to increase the flight envelope of a rotorcraft by supplying mechanical and/or propulsive power from an electrical power plant.

Indeed, the power plant of a rotorcraft may also comprise one or more electric machines for setting the mechanical transmission channel in motion. The heat engine or engines and the electric machine or machines are mechanically connected to the mechanical transmission channel. The rotor or rotors of the rotorcraft can then be rotated, via the mechanical transmission channel, separately or jointly by the heat engine or engines and by the electric machine or machines. Such a power plant is referred to for convenience as a "hybrid" power plant.

An electric machine may be an electric motor, carrying out only a driving function.

Alternatively, an electric machine may be reversible, thus carrying out a driving function and an electricity-generating function. The electric machine can then operate either in an "electric motor" mode to provide mechanical power to the mechanical transmission channel, or in an "electric generator" mode to generate electrical energy from mechanical power taken from the mechanical transmission channel.

Various implementations of an electric machine are possible in a hybrid power plant of a rotorcraft. For example, document FR 3 003 514 describes an electric machine connected to a main gearbox of the mechanical transmission channel arranged between the heat engine or engines and each rotor. An electric machine may also be positioned between a heat engine and this main gearbox, an electric machine then being associated with each turboshaft engine.

According to document FR 3 039 614, an electric machine of a hybrid power plant may be mechanically connected to a heat engine or to a mechanical transmission channel of the hybrid power plant, depending on the maximum mechanical power supplied by this electric machine.

Document FR 2 997 382 describes a hybrid power plant comprising at least two heat engines and at least one electric machine that intervenes following a failure of at least one heat engine in order to supply mechanical power at least partially compensating for the engine failure.

According to document FR 2 933 910, an electric machine is provided in order to limit the fuel consumption of the rotorcraft.

Moreover, document FR 3 084 318 describes a method for managing the energy of a hybrid power plant of a multirotor aircraft during a flight of the aircraft such that at least the take-off phase and the landing phase are carried out solely using electrical energy.

According to document FR 3 089 205, an aircraft comprises an architecture that is modular both from a mechanical point of view, in order to be able to transmit engine torque to at least one rotor of the aircraft, and from an electrical point of view, in order to be able to control engines of different types, and more precisely heat or electric engines, alternately or simultaneously.

According to document FR 3 092 926, a vertical take-off and landing aircraft comprises a hybrid propulsion system equipped with an on-board energy management system making it possible to select the type of propulsion, namely electric or thermal propulsion, depending on the available electrical energy and fuel, the flight plan and certain constraints, such as safety and environmental constraints.

In addition, a rotorcraft provided with a hybrid power plant may include a specific electrical network architecture, as described in documents FR 2 962 404 and FR 2 993 243, for example.

SUMMARY

An object of the present disclosure is therefore to provide a method for assisting the piloting of a rotorcraft provided with a hybrid power plant so that the rotorcraft can reach high altitudes, in particular higher than an altitude that can be reached with only the capabilities of a thermal power plant of the rotorcraft.

First of all, an object of the present disclosure is a method as claimed for assisting the piloting of a rotorcraft at high altitudes by supplying mechanical power from an electrical power plant of the rotorcraft, the rotorcraft comprising:
  at least one rotor;
  a hybrid power plant provided with an electrical power plant and a thermal power plant that are connected to said at least one rotor by a mechanical transmission channel, the thermal power plant comprising at least one heat engine, at least one engine computer of said at least one heat engine and at least one tank containing fuel supplying said at least one heat engine, the electrical power plant comprising at least one electric machine as well as at least one device for controlling said at least one electric machine and at least one electrical energy storage device supplying said at least one electric machine with electrical energy;
  a display device; and
  a computer.

This method is remarkable in that it includes the following steps:
  defining a take-off point of the rotorcraft and its initial altitude;
  defining a target point for the rotorcraft and its final altitude;
  determining a first maximum altitude that can be reached by the rotorcraft using only the thermal power plant, by means of the computer, according to a first altitude law, based on an initial total mass of the rotorcraft before take-off, an initial amount of boarded fuel contained in said at least one tank before the rotorcraft takes off, an atmospheric pressure and an air temperature, and an ageing state of said at least one heat engine;
  estimating a second maximum altitude that can be reached by the rotorcraft using the thermal power plant and the electrical power plant, by means of the computer, according to a second altitude law, based on the first maximum altitude, a predicted total mass of the rotorcraft at the target point and a predicted amount of intermediate electrical energy available in the at least one electrical energy storage device at the first maximum altitude; and
  displaying information relating to a comparison between the final altitude and the second maximum altitude on the display device of the rotorcraft.

This method therefore makes it possible to advantageously increase the flight envelope of the rotorcraft and, in particular, the maximum altitude that can be reached, by means of the additional use of an electrical power plant. This method can facilitate flights in a mountainous region, for example for rescuing people and transporting equipment.

The first altitude law may take into account the characteristics of the thermal power plant and, in particular, the fuel consumption of the heat engine or engines and the mechanical power that the thermal power plant can provide.

The second altitude law may take into account the characteristics of the electrical power plant and, in particular, the electrical energy consumption of the electric machine or machines and the mechanical power that the electrical power plant can provide.

Each altitude law may be established by trials, calculations and/or simulations. The term "law" refers to any means that make it possible to perform the calculations in question, such as tables of values, equations or charts, stored, for example, in a memory of the computer or in a memory connected to the computer.

The method then makes it possible to display information relating to a comparison between the final altitude and the second maximum altitude on the display device of the rotorcraft. For example, if the second maximum altitude is higher than or equal to the final altitude of the target point, the rotorcraft can reach the target point. Information confirming the possibility of the rotorcraft reaching the target point and carrying out the mission can therefore be displayed in order to assist the pilot. This information may be in the form of an indicator light being illuminated, for example a green indicator light, a message being displayed indicating that the target point can be reached, or the difference between the final altitude and the second maximum altitude being displayed on the display device.

Conversely, if the second maximum altitude is lower than the final altitude, the target point cannot be reached by the rotorcraft and the mission is impossible. Information can therefore be displayed to indicate this to the rotorcraft pilot. This information may be in the form of an indicator light being illuminated, for example a red indicator light, a message being displayed indicating that the target point cannot be reached, or the difference between the final altitude and the second maximum altitude being displayed on the display device.

The method may also comprise generating an alert when the final altitude is higher than the second maximum altitude.

The method according to the disclosure may include one or more of the following features, taken individually or in combination.

For example, defining the take-off point of the rotorcraft and its initial altitude may comprise the following sub-steps:
  defining an initial position of the take-off point of the rotorcraft; and determining the initial altitude of the take-off point, from the initial position of the take-off point and a terrain database or a three-dimensional map.

The initial position of the take-off point of the rotorcraft may be provided by a receiver of a satellite positioning system transmitting a signal to the computer carrying information relating to a current position of the rotorcraft, for example in the form of coordinates in a terrestrial reference frame, such as a latitude and a longitude.

The initial position of the take-off point of the rotorcraft may also be input by the pilot or a member of the crew of the rotorcraft using an interface connected to the computer. Such an interface denotes, for example, a keyboard or a screen provided with a touch panel. This initial position may be input in the form of coordinates in the terrestrial reference frame or by pointing to the take-off point on a map displayed on a screen.

Next, the computer may determine the initial altitude of the take-off point by positioning it on a three-dimensional map or relative to a terrain database stored in a memory of the computer or in a memory connected to the computer.

Similarly, defining the target point for the rotorcraft and its final altitude may comprise the following sub-steps:
defining a final position of the target point; and
determining the final altitude of the target point, from the position of the target point and the terrain database or the three-dimensional map.

The final position of the target point may be input by the pilot or a member of the crew of the rotorcraft using the interface. This final position may be input as coordinates in the terrestrial reference frame or by pointing to the target point on a map displayed on a screen.

Next, the computer may determine the final altitude of the target point by positioning it on a three-dimensional map or relative to a terrain database stored in a memory of the computer or in a memory connected to the computer.

According to another example, the method may include determining a flight distance between the take-off point and the target point, using the computer.

The flight distance can be calculated according to a straight flight path between the take-off point and the target point, i.e., according to the shortest distance between the take-off point and the target point.

The flight distance can be calculated according to a non-straight flight path between the take-off point and the target point, this non-straight flight path being able to be determined by the computer by taking into account the relief and/or the weather conditions, avoiding flying over particular areas, for example comprising a village, or indeed a stored avalanche risk area. This curvilinear flight path may be determined by the computer using a three-dimensional map and/or a terrain database stored in a memory of the computer or in a memory connected to the computer. This curvilinear flight path may also be determined by the computer using weather forecasts of the area between the take-off point and the target point, these weather forecasts having been previously stored in a memory of the computer or in a memory connected to the computer.

This curvilinear flight path makes it possible, for example, to bypass a stormy area or strong turbulence, possibly while remaining close to the ground or the relief. This curvilinear flight path also avoids mountain ranges or makes it possible to follow a valley, for example.

According to another example, the method may comprise checking the feasibility of the mission, based on the flight distance, the initial total mass of the rotorcraft before take-off, the initial amount of boarded fuel contained in said at least one tank before take-off, and a fuel consumption law of the rotorcraft. Checking the feasibility of the mission in this way makes it possible to check that the initial amount of fuel is sufficient to allow the rotorcraft to reach the target point and return to the take-off point.

The initial total mass of the rotorcraft may be determined using a dedicated mass determination device, for example measuring a load borne by a wheel of a landing gear of the rotorcraft, as described in documents FR 2 986 322 and FR 3 068 004, for example. The mass determination device then transmits a signal carrying this information of the initial total mass of the rotorcraft to the computer.

The initial total mass of the rotorcraft may also be determined by an operator inputting, via the interface, the masses of the various elements on board the rotorcraft, namely the mass of the payload or payloads, the mass of the crew and the initial mass of the boarded fuel contained in said at least one tank. The initial mass of boarded fuel may also be determined by measuring the initial amount of fuel contained in the at least one tank using an instrument, such as a gauge, and transmitting to the computer a signal carrying a value relating to the mass or volume of said boarded fuel.

If the mission feasibility check concludes that the initial amount of boarded fuel is insufficient, the method comprises generating an alert indicating this to the pilot or crew of the rotorcraft.

This mission feasibility check may also take into account the mass of the payload or of the person or persons to be embarked on the rotorcraft and/or to be disembarked from the rotorcraft at the target point. This mass of the payload or of the person or persons to be embarked and/or disembarked may have been previously stored in a memory of the computer or connected to the computer, having been input by the pilot or a member of the crew of the rotorcraft, by means of the interface, or following receipt of a signal carrying information relating to this mass and transmitted to the computer.

Furthermore, in order to determine the first maximum altitude, the method uses the atmospheric pressure and the air temperature, this atmospheric pressure and the air temperature being forecast or estimated at the target point.

To this end, a predicted atmospheric pressure and a predicted air temperature at the target point may have been previously stored in a memory of the computer or in a memory connected to the computer, by the pilot or a member of the crew of the rotorcraft using a keyboard or a screen provided with a touch panel to input the values of the predicted atmospheric pressure and the predicted temperature, or following receipt of a signal carrying forecast information relating to this predicted atmospheric pressure and this predicted temperature via the receiving device of the rotorcraft and transmitted to the computer.

The method may also comprise determining the predicted atmospheric pressure and the predicted air temperature at the target point, comprising the following sub-steps:
determining an initial atmospheric pressure and an initial temperature at the take-off point; and
calculating the predicted atmospheric pressure and the predicted temperature, by means of the computer, based on the initial atmospheric pressure, the initial temperature, the initial altitude and the final altitude.

The initial atmospheric pressure and the initial temperature may be determined by the pilot or a member of the crew of the rotorcraft using the interface to input the values of the initial atmospheric pressure and the initial temperature, or on receipt of a signal carrying forecast information relating to this initial atmospheric pressure and this initial temperature via the receiving device of the rotorcraft and transmitted to the computer.

The initial atmospheric pressure and the initial temperature may also be determined by measuring the initial atmospheric pressure and the initial temperature by means of one or two dedicated measuring devices, for example a barometer and a thermometer on board the rotorcraft or any other anemobarometric device. This or these two measuring devices then transmit one or two signals carrying the values of the initial atmospheric pressure and the initial temperature at the rotorcraft, and thus of the take-off point.

The computer can then calculate the predicted atmospheric pressure and the predicted temperature by applying known formulas, based on the initial altitude, the final altitude, the initial atmospheric pressure and the initial temperature. The predicted atmospheric pressure and the predicted air temperature can thus be taken into account in order to determine the first maximum altitude.

Furthermore, in order to determine the first maximum altitude, the method uses the initial total mass of the rotorcraft before take-off as input data for the first altitude law.

In order to determine the second maximum altitude, the method uses the predicted total mass of the rotorcraft at the target point as input data for the second altitude law.

For this purpose, a value of the predicted total mass may have been previously stored in a memory of the computer or in a memory connected to the computer. This estimated value may have been input by the pilot or a member of the crew of the rotorcraft, using the interface.

The predicted total mass of the rotorcraft at the target point may also be an output value of the first altitude law, in particular depending on the initial mass of the rotorcraft before take-off.

The method may also comprise estimating the predicted total mass of the rotorcraft at the target point, using the computer, based on an initial total mass of the rotorcraft before take-off and the flight distance between the take-off point and the target point, the estimation of a predicted total mass including the following sub-steps:
  determining the initial total mass of the rotorcraft at take-off;
  estimating a predicted mass of fuel consumed between the take-off point and the target point, based on the initial total mass, the flight distance between the take-off point and the target point, and the weather conditions; and
  estimating the predicted total mass of the rotorcraft at the target point by subtracting the predicted mass of fuel consumed from the initial total mass.

The predicted mass of fuel consumed between the take-off point and the target point can be calculated by the computer according to the fuel consumption law, in particular based on the initial total mass, the flight distance and the weather conditions, namely the atmospheric pressure and the air temperature between the take-off point and the target point.

A margin of uncertainty may be added to the mass of fuel consumed. This margin of uncertainty can be used to compensate for an estimate of this mass of fuel consumed made by a theoretical calculation, as opposed to a calculation based on readings or measurements. This margin of uncertainty may also be used to allow for a possible change in the flight path of the rotorcraft during flight or an increase in the mass of the payload to be embarked at the target point, for example. Such a margin of uncertainty may be between 5% to 20% of the mass of fuel consumed.

Furthermore, in order to determine the first maximum altitude, the computer uses an ageing state of the at least one heat engine. The current ageing state of a heat engine makes it possible to define the current level of performance of the rotorcraft, which lies between a level of performance in the new state and a level of performance in an aged state, corresponding to the maximum authorized ageing state of this heat engine.

According to a first variant, the method may consider that the ageing state of the at least one heat engine used by the method when determining the first maximum altitude is equal to the maximum authorized ageing state of this heat engine and use this maximum authorized ageing state when determining the first maximum altitude. The difference between the current ageing state and the maximum ageing state may be disadvantageous in terms of the range of the flight envelope, but may also help automatically take a safety margin into account when calculating the first maximum altitude.

According to a second variant, the method may consider that the ageing state of the at least one heat engine is equal to the most recent ageing state previously determined for the rotorcraft. Indeed, the ageing state of said at least one heat engine is determined during certain flights of the rotorcraft, or indeed during most of the flights, when possible, for example by applying a specific procedure allowing parameters of the heat engine to be measured and deducing its ageing state therefrom.

According to a third variant, the method may comprise estimating an ageing state of said at least one heat engine at the target point, based on the most recent previously determined ageing states, in order to determine the ageing state used by the method when determining the first maximum altitude.

Indeed, knowing the most recent previously determined ageing states and the dates on which they were determined makes it possible to estimate, by interpolation and in advance, the current ageing state of said at least one heat engine of the rotorcraft. Such interpolation is particularly reliable when the rotorcraft frequently performs the same mission profiles. Similarly, by estimating the flight time to the target point, based on the flight distance, it is possible to estimate, by interpolation and in advance, the ageing state of said at least one heat engine once the rotorcraft has arrived at the target point, based on these most recent ageing states and the dates on which they were determined.

According to a fourth variant, the method may comprise determining an ageing state of said at least one heat engine. This determination of an ageing state of said at least one heat engine may be carried out, in particular, while the rotorcraft is flying towards the target point, so as to take into account the current ageing state of the rotorcraft in order to determine the first maximum altitude.

Furthermore, in order to determine the second maximum altitude, the computer uses a predicted amount of intermediate electrical energy available in said at least one electrical energy storage device at the first maximum altitude.

For this purpose, the method may comprise determining the predicted amount of intermediate electrical energy, comprising the following sub-steps:
  determining an initial amount of electrical energy available in said at least one electrical energy storage device at take-off, said at least one electrical energy storage device comprising an engine computer transmitting a signal carrying information relating to the initial amount of electrical energy to the computer;

estimating a predicted amount of electrical energy consumed between the take-off point and a point situated at the first maximum altitude between the take-off point and the target point; and estimating the predicted amount of intermediate electrical energy by subtracting the predicted amount of electrical energy consumed from the initial amount of electrical energy.

Said at least one electrical energy storage device may comprise a management device capable of determining, at any time, the amount of energy contained in the electrical energy storage device or devices, this amount of energy being available to supply power to said at least one electric machine.

Therefore, before the rotorcraft takes off, the management device can transmit to the computer a signal carrying information relating to this initial amount of energy.

The computer can then estimate the predicted amount of electrical energy consumed by the rotorcraft when it reaches the first maximum altitude, based on the flight distance and a power consumption law of the rotorcraft in flight. The power consumption law may have been determined by calculation or based on previous flights of the rotorcraft, or of similar rotorcraft, for example. The power consumption law is determined, for example, from the average power consumption of the rotorcraft in flight.

The computer may subtract the predicted amount of electrical energy consumed from the initial amount of electrical energy in order to estimate the predicted amount of intermediate electrical energy.

Determining a predicted amount of intermediate electrical energy may also comprise estimating a predicted amount of electrical energy that may be generated during the flight of the rotorcraft up to the first maximum altitude and stored in the at least one electrical energy storage device, if possible, i.e., if the maximum electrical energy storage capacity is not reached. The computer may, for example, determine the predicted amount of electrical energy that may be generated during the flight based on the flight distance according to a power production law of the rotorcraft in flight. The power production law may have been determined by calculation or based on previous flights of the rotorcraft, or of similar rotorcraft, for example. The power production law is determined, for example, from the average power production of the rotorcraft in flight.

The computer can then add the predicted amount of electrical energy that may be generated during the flight to the estimate of the predicted amount of intermediate electrical energy that was calculated previously.

Moreover, the predicted amount of intermediate electrical energy can be considered to be equal to the initial amount of electrical energy, if the electrical energy storage device of the hybrid power plant is not used to supply power to an on-board network of the rotorcraft.

The computer can also take into account an energy reserve that the electrical energy storage device must have once the target point has been reached. This energy reserve makes it possible to ensure a safe return flight, for example in order to supply power to the electrical equipment of the rotorcraft and, if required, in the event of a failure of a heat engine.

In addition, estimating the second maximum altitude may comprise the following sub-steps:

calculating an additional altitude that can be reached by the rotorcraft using the electrical power plant from the first maximum altitude according to the second altitude law, based on the predicted total mass of the rotorcraft and the initial amount of electrical energy available in said at least one electrical energy storage device; and calculating the second maximum altitude by adding the first maximum altitude and the additional altitude.

In this case, the second altitude law defines an additional altitude that can be reached by virtue of the mechanical power supplied by the electrical power plant at least above the first maximum altitude. This additional altitude is advantageously unrelated to the first maximum altitude.

In addition, the method may comprise setting parameters of an aerodynamic configuration of the rotorcraft, the determinations of the first maximum altitude and the second maximum altitude taking into account this aerodynamic configuration.

Indeed, the aerodynamic configuration has a direct effect on the performance of the rotorcraft, and therefore on the first maximum altitude and the second maximum altitude and, if applicable, the additional altitude. In particular, the performance is degraded by the presence of optional appendages or equipment that generate additional aerodynamic drag, for example. Such equipment comprises, for example, a winch or a stretcher placed on a skid of the skid landing gear of the rotorcraft.

A system for protecting the air intake or intakes of the thermal power plant may also be taken into account in the aerodynamic configuration of the rotorcraft. Such a system may, for example, comprise a simple grille arranged in front of an air intake, a device referred to as a "vortex" device arranged in an air intake or indeed a device referred to by the acronym IBF, standing for "Inlet Barrier Filter", arranged at an air intake. Such a system may generate relatively significant pressure drops that can directly affect the operational capacities of a heat engine, and thus reduce its performance.

Furthermore, if the final altitude of the target point is higher than the second maximum altitude, the method may comprise estimating a "target" total mass of the rotorcraft, this "target" total mass of the rotorcraft being a total mass of the rotorcraft before take-off allowing the second maximum altitude to be higher than or equal to the final altitude. During display, information relating to this "target" total mass is displayed on the display device. This displayed information may be the value of the "target" total mass or the difference between the initial total mass and the "target" total mass, i.e., the mass to be removed from the rotorcraft before take-off in order to enable the target point to be reached.

This estimate of a "target" total mass of the rotorcraft may be obtained, for example, by iteration, by successively calculating second maximum altitudes by reducing the initial total mass of the rotorcraft until a second maximum altitude is obtained that is at least higher than the final altitude.

Similarly, if the final altitude of the target point is higher than the second maximum altitude, the method may comprise estimating an additional amount of fuel to be added to said at least one tank in order for the second maximum altitude to be higher than or equal to the final altitude. During display, information relating to this additional amount of fuel to be added is displayed on the display device. The computer can take into account the capacity of said at least one tank and display this information if it is compatible with this capacity and the initial amount of fuel.

If the final altitude of the target point is higher than the second maximum altitude, the method may also comprise estimating an additional amount of electrical energy to be added in order for the second maximum altitude to be higher than or equal to the final altitude. During display, information relating to this additional amount of electrical energy to be added is displayed on the display device.

As when estimating the "target" total mass of the rotorcraft, the estimates of the additional amount of fuel to be added and the additional amount of electrical energy can be obtained by iteration.

The computer can take into account the capacity of said at least one electrical energy storage device and the initial amount of electrical energy contained in said at least one electrical energy storage device in order to recommend charging said at least one electrical energy storage device before the rotorcraft takes off or replacing the at least one electrical energy storage device with another electrical energy storage device with a greater capacity and/or containing sufficient electrical energy. The computer can then display a message to this effect on the display device.

If the initial amount of boarded fuel is greater than the amount necessary to reach the target point, the computer can also recommend charging said at least one electrical energy storage device during the flight, by means of the thermal power plant, using an electrical energy generator of the electrical power plant or said at least one electric machine, when it is reversible.

In order to be able to carry out his or her mission, the pilot of the rotorcraft can therefore choose, depending on said mission and its degree of urgency, to reduce the weight of the rotorcraft, charge the electrical energy storage device and/or add an additional amount of fuel.

The method may also comprise determining an engagement altitude of said at least one electric machine, based on the first maximum altitude, the final altitude, the predicted amount of intermediate electrical energy and an engagement margin, said at least one electric machine driving said at least one rotor, starting from this engagement altitude. Indeed, starting from this engagement altitude, the thermal power plant and the electrical power plant jointly rotate said at least one rotor. Said at least one electric machine may be started at the engagement altitude or indeed at an altitude lower than this engagement altitude, without supplying power to the mechanical transmission channel until the altitude of the rotorcraft is equal to or higher than the engagement altitude. Starting said at least one electric machine at an altitude lower than this engagement altitude allows said at least one electric machine to be very reactive in order to drive said at least one rotor almost instantaneously as soon as the rotorcraft is at the engagement altitude.

The engagement margin depends, for example, on a selected flight mode and/or the predicted amount of intermediate electrical energy.

The method may also comprise determining a pre-engagement altitude of said at least one electric machine, based on the first maximum altitude, the final altitude, the predicted amount of intermediate electrical energy and a pre-engagement margin, the pre-engagement altitude being lower than the engagement altitude. At this pre-engagement altitude, said at least one electric machine is started, without helping rotate said at least one rotor.

Said at least one electric machine is, for example, connected to the mechanical transmission channel by a free-wheel and rotates at a speed slightly lower than the speed of rotation of the mechanical transmission channel between the pre-engagement altitude and the engagement altitude, said at least one electric machine thus not supplying any mechanical power to the mechanical transmission channel, and consequently to said at least one rotor.

At the engagement altitude, the speed of rotation of said at least one electric machine increases to reach the speed of rotation of the mechanical transmission channel such that said at least one electric machine supplies mechanical power to the mechanical transmission channel, and consequently to said at least one rotor, via the free-wheel.

The pre-engagement margin depends, for example, on a selected flight mode and/or the predicted amount of intermediate electrical energy.

The flight mode may be a mode referred to as a "conventional" mode, conserving the electrical energy of the storage device in order to reach the final altitude and return to the starting point. The engagement altitude and, if applicable, the pre-engagement altitude, are close to the first maximum altitude so as not to consume electrical energy to supply power to said at least one electric machine before the rotorcraft reaches the engagement altitude or, if applicable, the pre-engagement altitude. The engagement altitude may be equal to 95% of the first maximum altitude, for example, and, if applicable, the pre-engagement altitude may be equal to 90% of the first maximum altitude, for example.

The flight mode may be a mode referred to as an "emergency" mode, helping to reach the target point as quickly as possible and also return to the starting point as quickly as possible. To this end, the engagement altitude and, if applicable, the pre-engagement altitude, are as close as possible to the initial altitude, depending on the predicted amount of intermediate electrical energy, so that the thermal power plant and the electrical power plant jointly rotate the at least one rotor as early as possible during the flight. The engagement altitude and, if applicable, the pre-engagement altitude may, for example, be equal to the initial altitude if the predicted amount of intermediate electrical energy is sufficient. In this case, the flight of the rotorcraft is carried out from the take-off point, and up to the target point, with said at least one electric machine being started as soon as the rotorcraft takes off, said at least one rotor being rotated jointly by the thermal power plant and by the electrical power plant.

The flight mode may be a mode referred to as a "safe" mode, keeping the flight of the rotorcraft safe. For this purpose, the pre-engagement altitude is equal to the initial altitude, meaning that the at least one electric machine is started as soon as the rotorcraft takes off. Therefore, said at least one electric machine is ready, in the event of a failure of a heat engine, to help rotate said at least one rotor in order to limit or indeed eliminate the loss of power due to the failure of said heat engine, or in order to facilitate entry into an autorotation mode. The engagement altitude is close to the first maximum altitude so as not to consume electrical energy to power said at least one electric machine before the rotorcraft reaches the engagement altitude, if no failure has occurred.

The flight mode may be a mode referred to as an "economy" mode, conserving the fuel consumption of the rotorcraft in order to reach the final altitude and return to the starting point. The engagement altitude and, if applicable, the pre-engagement altitude, are determined so as to minimize fuel consumption during the flight. In particular, the engagement altitude and, if applicable, the pre-engagement altitude, are determined based on the amount of electrical energy available in the storage device so that the majority of the electrical energy is consumed during the entire flight.

Naturally, irrespective of the flight mode, the engagement altitude is determined such that the electrical energy available at the first maximum altitude is sufficient in order to enable the rotorcraft to reach the final altitude and return to the starting point.

The method according to the disclosure may also comprise implementing a flight of the rotorcraft to the target point, as claimed. Implementing a flight of the rotorcraft in this way comprises engaging said at least one electric machine at an engagement altitude, said at least one electric machine driving said at least one rotor, starting from the engagement altitude. Therefore, said at least one electric machine and said at least one heat engine jointly drive said at least one rotor, starting from said engagement altitude.

The implementation of the flight may also comprise the following sub-steps:
- updating the first maximum altitude that can be reached by the rotorcraft;
- updating the predicted amount of intermediate electrical energy;
- updating the second maximum altitude that can be reached by the rotorcraft; and
- updating the engagement altitude of said at least one electric machine.

Indeed, the flight conditions may differ from the forecasts. For example, the rotorcraft may encounter a stronger headwind than expected or, on the contrary, a tailwind, thus modifying its fuel consumption between the take-off point and the target point and, consequently, the values of the first maximum altitude and the second maximum altitude.

The rotorcraft may also implement the flight along a flight path different from that envisaged, thereby modifying the flight distance and, consequently, its fuel consumption between the take-off point and the target point. Such a change in the flight path may take place, for example, after receiving new weather conditions or information about an area to be avoided.

The implementation of the flight may also comprise determining the ageing state of said at least one heat engine during the flight between the take-off point and the target point, particularly when the flight distance between the take-off point and the target point is sufficiently large to be able to take into account the current ageing state of the rotorcraft generated by this flight time. The updating of the first maximum altitude that can be reached by the rotorcraft can then correct and take into account this actual ageing state of the engine, which will have been determined in flight.

The implementation of the flight of the rotorcraft may also comprise measuring a rate of climb of the rotorcraft by means of a dedicated measuring device, for example a vertical speed indicator on board the rotorcraft, and calculating a monitoring parameter based on this rate of climb of the rotorcraft.

For example, the monitoring parameter is equal to a first derivative of the rate of climb of the rotorcraft. The monitoring parameter may optionally be based on the first derivative of the rate of climb of the rotorcraft, the second derivative of the rate of climb, and/or the rate of climb itself.

The engagement of said at least one electric machine can then take place when this monitoring parameter is lower than a predetermined engagement climb rate and when an additional engagement condition is validated.

The additional engagement condition may be validated, for example, when no engagement cancellation action has been performed by a pilot of the rotorcraft or another crew member for a predetermined first time period during which the monitoring parameter remains lower than the engagement climb rate. The implementation of the flight then comprises displaying information indicating that the monitoring parameter is lower than the engagement climb rate. The additional engagement condition may also be validated if an engagement validation action is performed by the pilot of the rotorcraft before the end of this predetermined first time period. The predetermined first time period is equal to 5 seconds, for example.

The additional engagement condition may also be validated when an engagement validation action is performed by the pilot of the rotorcraft after the monitoring parameter has dropped below the engagement climb rate, the implementation of the flight comprising displaying information indicating that the monitoring parameter is lower than the engagement climb rate. No time period is then taken into account, and engagement does not take place without the pilot's action.

The additional engagement condition may also be validated when the rotorcraft is situated at an altitude higher than an engagement validation altitude, this engagement validation altitude being equal to the first maximum altitude multiplied by an engagement coefficient lower than 1. For example, the engagement coefficient is equal to 0.90.

The implementation of the flight of the rotorcraft may also comprise pre-engaging said at least one electric machine, for example at a pre-engagement altitude.

The pre-engagement of said at least one electric machine may also take place when the monitoring parameter is lower than a predetermined pre-engagement climb rate and when an additional pre-engagement condition is validated.

The additional pre-engagement condition may be validated, for example, when no pre-engagement cancellation action has been performed by a pilot of the rotorcraft or another crew member for a predetermined second time period during which the monitoring parameter remains lower than the pre-engagement climb rate. The method then comprises displaying information indicating that the monitoring parameter is lower than the pre-engagement climb rate. The additional pre-engagement condition may also be validated if a pre-engagement validation action is performed by the pilot of the rotorcraft before the end of this predetermined second time period. The predetermined second time period is equal to 5 seconds, for example.

The additional pre-engagement condition may also be validated when a pre-engagement validation action is performed by the pilot of the rotorcraft after the monitoring parameter has dropped below the pre-engagement climb rate, the method comprising displaying information indicating that the monitoring parameter is lower than the pre-engagement climb rate. No time period is then taken into account, and pre-engagement does not take place without the pilot's action.

The additional pre-engagement condition may also be validated when the rotorcraft is situated at an altitude higher than a pre-engagement validation altitude, this pre-engagement validation altitude being equal to the first maximum altitude multiplied by a pre-engagement coefficient lower than the engagement coefficient, and consequently lower than 1. For example, the pre-engagement coefficient is equal to 0.80.

The method may also comprise limiting the energy consumption of the rotorcraft in the event that the computer determines that the predicted amount of intermediate electrical energy becomes, during flight, insufficient for the rotorcraft to reach the target point. Limiting the energy consumption of the rotorcraft in this way may comprise the following sub-steps:
- disengaging a generator of the rotorcraft if this generator is consuming more mechanical energy in the electric current generator mode than it supplies in electrical energy to the on-board network or to the at least one electrical energy storage device;

carrying out electrical load shedding of power supply buses that are non-essential, i.e., that are not supplying equipment essential for the flight of the rotorcraft;

disconnecting the equipment and electricity consumers connected to the on-board electricity network and that are not essential for implementing the flight of the rotorcraft; and reducing the power drawn off said at least one heat engine if this power is not essential.

Reducing the power drawn off said at least one heat engine relates, for example, to power intended for heating the passenger compartment of the rotorcraft, and such power may be considered to be non-essential if the members of the crew of the rotorcraft are wearing survival equipment, for example. Likewise, if the weather is fine in a mountain region, or if the "target" altitude is not in an area with icing conditions, the power taken off to help windshield de-misting and/or de-icing, for example, can be reduced or disconnected. The reduction in the power taken off for these functions can involve stopping them altogether.

Another object of the present disclosure is a rotorcraft comprising:
at least one rotor, such as a main rotor, an auxiliary rotor and/or one or more propellers;
a hybrid power plant provided with an electrical power plant and a thermal power plant connected to said at least one rotor by a mechanical transmission channel, the thermal power plant comprising at least one heat engine and at least one engine computer of said at least one heat engine, the electrical power plant comprising at least one electric machine, at least one device for controlling said at least one electric machine and at least one electrical energy storage device supplying said at least one electric machine with electrical energy; and
a computer.

The computer of the rotorcraft is configured to implement the method for managing a flight of a rotorcraft at high altitude using a hybrid power plant as described above.

The electrical power plant may be included in the design and manufacture of the rotorcraft. The electrical power plant may also have been added during an operation to upgrade the rotorcraft in order to allow the rotorcraft to expand its flight envelope. The electrical power plant may also be in the form of several kits having different amounts of available electrical energy and, consequently, different masses, which the operator of the rotorcraft may install depending on the missions to be carried out.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
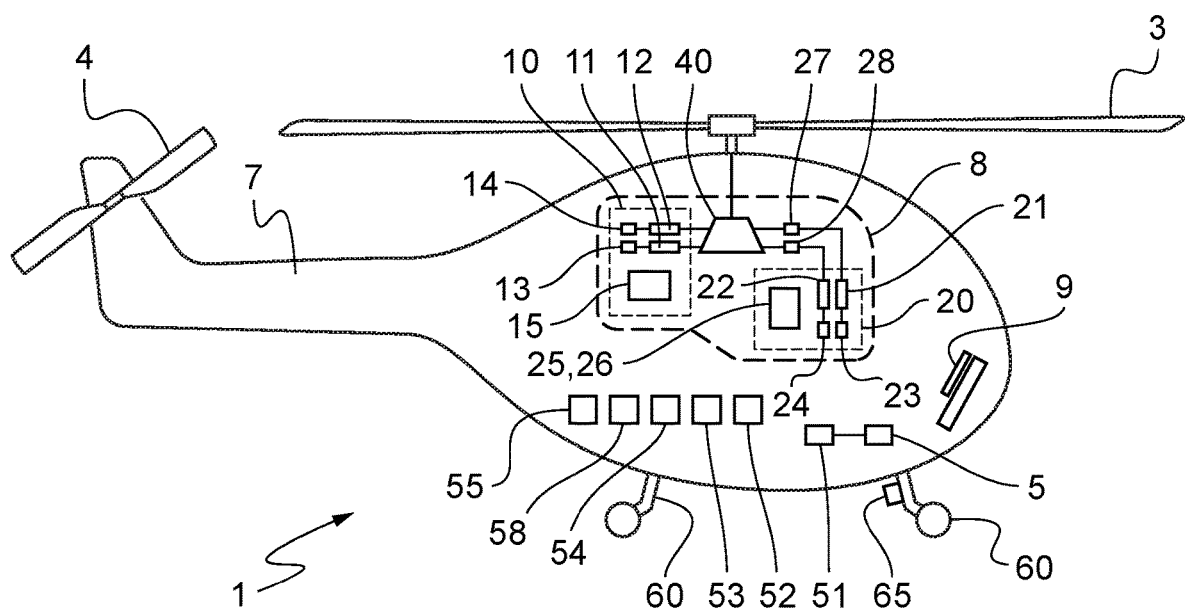
FIG. 1 is a side view diagram of a rotorcraft according to the disclosure.

FIG. 1 shows a rotorcraft 1 comprising a fuselage 2, at least one rotor 3, 4 and a hybrid power plant 8. The at least one rotor 3, 4 may comprise, for example, a main rotor contributing to the lift, and also the forward travel, of the rotorcraft 1. The at least one rotor 3, 4 may also comprise an auxiliary rotor capable of opposing the torque induced by the rotation of the main rotor 3 on its fuselage 2 and of controlling the yaw of the rotorcraft 1. The at least one rotor 3, 4 may also comprise one or more propellers contributing to the forward travel of the rotorcraft 1.

According to the example shown in FIG. 1, the rotorcraft 1 comprises a main rotor 3 arranged above the fuselage 2 and an auxiliary rotor 4, at the end of a tail boom 7. The rotorcraft 1 may also comprise one or more propellers.

The hybrid power plant 8 comprises a thermal power plant 10 and an electrical power plant 20 connected to the rotors 3, 4 by a mechanical transmission channel 40. The thermal power plant 10 comprises at least one heat engine 11, 12, an engine computer 13, 14 for each heat engine 11, 12 and at least one tank 15 containing fuel supplying each heat engine 11, 12.

A heat engine 11, 12 may for example be a piston engine or a gas turbine, also referred to as a "turboshaft engine". Each engine computer 13, 14 makes it possible, in particular, to control the starting and stopping of a heat engine 11, 12 as well as to control and modify the speed of this heat engine 11, 12, in order to regulate its operation. Such an engine computer 13, 14 may also comprise sensors in order to measure operating parameters of the heat engine 11, 12, such as, for example, a temperature, a speed of rotation of a moving member, etc.

The electrical power plant 20 comprises at least one electric machine 21, 22 as well as at least one control device 23, 24 and at least one electrical energy storage device 25 supplying the electric machine or machines 21, 22 with electrical energy.

The electrical power plant 20 may comprise a single control device 23 for managing all the electric motors 21, 22 when the electrical power plant 20 comprises at least one electric motor 21, 22 or else one control device 23, 24 for each electric motor 21, 22 when the electrical power plant 20 comprises at least two electric motors 21, 22. A control device 23, 24 makes it possible, in particular, to control the power supply to one or more electric machines 21, 22 and the switching off of this power supply, as well as to control and modify the speed of this or these electric machines 21, 22 in order to regulate its operation or their operation. Such a control device 23, 24 may comprise a computer and, for example, a device referred to by the acronym ESC, standing for "Electronic Speed Controller".

The at least one electrical energy storage device 25 may comprise a rechargeable device, such as a rechargeable battery, or a non-rechargeable device, such as a non-rechargeable battery, a fuel cell or a thermal battery, for example. The at least one electrical energy storage device 25 may be dedicated to the operation of the electrical power plant 20 or be shared with an on-board network of the rotorcraft 1 and used to supply electrical energy to this on-board network and to the electrical and electronic equipment connected thereto.

The hybrid power plant 8 makes it possible to rotate the rotor or rotors 3, 4 via the mechanical transmission channel 40, by means of the electrical power plant 20 and/or the thermal power plant 10.

The mechanical transmission channel 40 is connected to the rotors 3, 4 and to the heat engines 11, 12 and the electric machines 21, 22. For example, the mechanical transmission channel 40 may comprise a main gearbox arranged between the thermal 10 and electrical 20 power plants and the main rotor 3, a mast of the main rotor 3 being connected to an output of the main gearbox. The mechanical transmission channel 40 may also include at least one auxiliary gearbox arranged between the main gearbox and the auxiliary rotor 4.

According to the example shown in FIG. 1, the thermal power plant 10 comprises two heat engines 11, 12, two engine computers 13, 14 and a tank 15, while the electrical power plant 20 comprises two electric machines 21, 22, two control devices 23, 24 and an electrical energy storage device 25.

According to another aspect, at least one electric machine 21 is reversible and can therefore function firstly as an electric motor and secondly as an electric generator 26. An electrical energy storage device 25 can in this case be recharged with electrical energy and comprises, for example, a rechargeable battery.

The rotorcraft 1 may further comprise a location receiver 52 of a satellite positioning system providing a position of the rotorcraft 1 in a terrestrial reference frame. This position may comprise coordinates of the rotorcraft 1 in the terrestrial reference frame, for example latitude and longitude coordinates, as well as its altitude.

The rotorcraft 1 may further comprise a barometer 53 and a thermometer 54 for measuring an initial atmospheric pressure and an initial temperature at the rotorcraft 1.

The rotorcraft 1 may also comprise a landing gear 60 provided with a mass determination device 65 measuring a load borne by this landing gear 60, in order to deduce therefrom the initial total mass of the rotorcraft 1 before take-off.

The rotorcraft 1 may also comprise a receiving device 55 for receiving information, such as information relating to a mission to be carried out, or weather forecasts.

The rotorcraft 1 may also comprise a measuring device, for example a vertical speed indicator 58, dedicated to measuring a rate of climb of the rotorcraft 1. Such a rate of climb can also be determined using the location receiver 52.

The rotorcraft 1 may also comprise a computer 5, a memory 51 and a display device 9, such as a screen, a head-up display or a display integrated into the pilot's helmet, for example, and an interface for inputting information. This interface is connected via a wired or wireless link to the computer 5 in order to allow an analog, digital, electrical or optical signal carrying the input information to be transmitted. For example, the interface may comprise a keyboard, a touch panel of the display device 9, a mouse, a trackball, or a voice or visual control.

By way of example, the computer 5 may comprise at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc. The computer 5 may be dedicated to carrying out the method according to the disclosure or else be shared with other functions of the rotorcraft 1 and be integrated, for example, into an avionics system of the rotorcraft 1.

Figure 2:
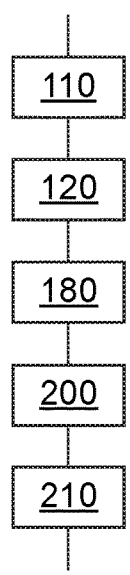
FIG. 2 is an overview diagram of a method for assisting piloting according to the disclosure.

The computer 5 may comprise the memory 51 or may be connected to the memory 51 via a wired or wireless link allowing an analog, digital, electrical or optical signal to be transmitted. The memory 51 can store one or more algorithms dedicated to carrying out a method for assisting the piloting of a rotorcraft at high altitudes by supplying mechanical power from an electrical power plant, an overview diagram of which is shown in FIG. 2.

This method comprises the following steps.

During a definition step 110, a take-off point PtD of the rotorcraft 1 and the initial altitude of this take-off point PtD are defined.

During a definition step 120, a target point PtO to be reached and the final altitude of this target point PtO are defined.

An initial position of the take-off point PtD and a final position of the target point PtO may be defined by their respective coordinates in a terrestrial reference frame, for example by their latitudes and their longitudes in this terrestrial reference frame.

The coordinates of the initial position of the take-off point PtD and its initial altitude may be provided by the location receiver 52, set by a crew member via the interface or indeed be received via the receiving device 55.

Similarly, the coordinates of the final position of the target point PtO and its final altitude may be set by a crew member via the interface or indeed received via the receiving device 55.

Figure 3:
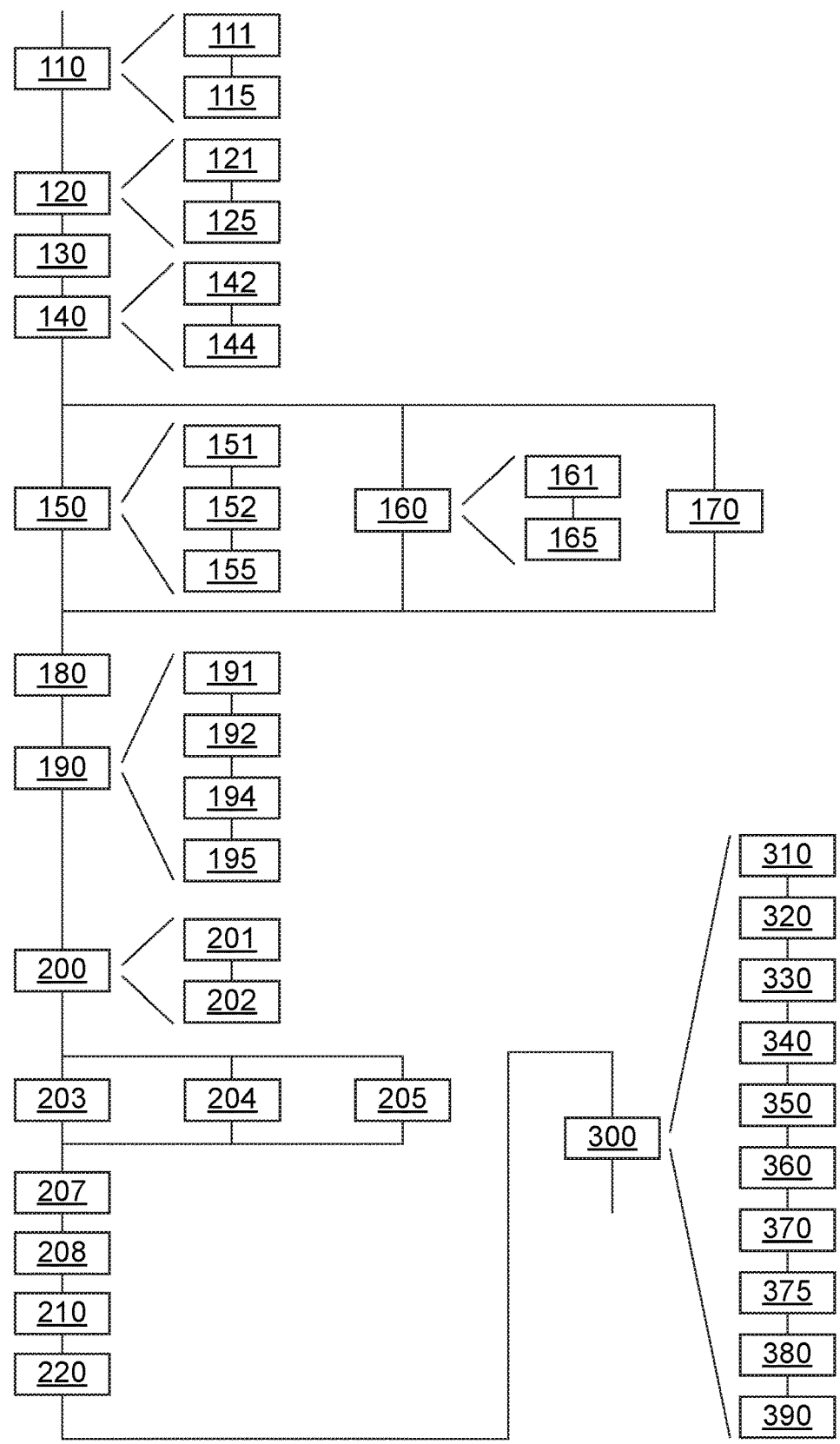
FIG. 3 is an overview diagram of a method for assisting piloting according to the disclosure.

The definition step 110 may also comprise sub-steps shown in FIG. 3. Defining 110 the take-off point PtD and the initial altitude may comprise the following sub-steps:
  defining 111 an initial position of the take-off point PtD of the rotorcraft; and
  determining 115, with the computer 5, the initial altitude of the take-off point PtD, from a terrain database or a three-dimensional map providing the altitude for each position.

Similarly, defining 120 the target point PtO and the final altitude may comprise the following sub-steps:
  defining 121 a final position of the target point PtO; and
  determining 125, with the computer 5, the final altitude of the target point PtO, from the position of the target point PtO and the terrain database or the three-dimensional map.

The method may comprise determining 130 a flight distance between the take-off point PtD and the target point PtO, by means of the computer 5, using the initial and final positions as well as the initial and final altitudes.

The computer 5 may calculate the flight distance according to a straight flight path between the take-off point PtD and the target point PtO.

The computer 5 may alternatively determine a non-straight flight path between the take-off point PtD and the target point PtO by taking into account the relief stored in the three-dimensional map, no-fly zones such as residential areas and/or the terrain database stored in the memory 51, and possibly by taking into account the weather conditions for which forecasts have, for example, been received by the receiving device 55 and stored in the memory 51. This non-straight flight path between the take-off point PtD and the target point PtO may also be determined by a dedicated computer and/or be stored in the memory 51.

The computer 5 can then calculate the flight distance according to this non-straight flight path.

The method may include a step 140 of checking the feasibility of the mission, based on the flight distance, an initial total mass of the rotorcraft 1 before take-off, an initial amount of boarded fuel contained in the tank 15 and a fuel consumption law of the rotorcraft 1. The computer 5 determines whether the initial amount of boarded fuel is sufficient to reach the target point PtO and return to the take-off point PtD. This checking step 140 may also take into account the mass of the payload or of the person or persons to be embarked on the rotorcraft and/or to be disembarked from the rotorcraft at the target point.

The fuel consumption law is stored in the memory 51 and may be in the form of charts, tables of values or equations.

The parameters used by the fuel consumption law, namely the initial total mass of the rotorcraft 1 and the initial amount of boarded fuel, may have been previously set using the interface and stored in the memory 51.

The initial amount of boarded fuel contained in the tank 15 may also be measured by a volumetric or mass gauge integrated into the tank 15.

The initial total mass of the rotorcraft can also be measured by the mass determination device 65.

The checking step 140 may comprise a step 142 of generating an alert with an alerter, at the command of the computer 5, if the initial amount of fuel is insufficient. The alert may be in visual form, for example displaying a red indicator light on the display device 9 and possibly displaying the additional amount of fuel to be added in order to reach the target point PtO and return to the take-off point PtD, or in audible or tactile form.

The checking step 140 may also include a display step 144 indicating that the mission may be carried out, if appropriate.

Next, during a determination step 180, the computer 5 determines a first maximum altitude AM1 that can be reached by the rotorcraft 1 using only the thermal power plant 10, according to a first altitude law, based on the initial total mass of the rotorcraft 1, the initial amount of boarded fuel contained in the tank 15 at take-off, an atmospheric pressure and an air temperature, and an ageing state of the heat engines 11, 12.

The first altitude law is stored in the memory 51 and may be in the form of charts, tables of values or equations.

The parameters used by the first altitude law may have been previously stored in the memory 51 after being set by an individual or following receipt via the receiving device 55.

The ageing state of each heat engine 11, 12 may also be considered to be equal to the most recent ageing state previously determined for the rotorcraft 1 during a previous flight. The ageing state of each heat engine 11, 12 may also be estimated at the target point PtO using several values of previously determined ageing states and based on the time required to reach the target point PtO and the flight time of the rotorcraft 1 since the most recent determined ageing state.

Alternatively, the ageing state of each heat engine 11, 12 may be considered to be equal to the maximum authorized ageing state.

The method according to the disclosure may also comprise a step 150 of estimating the predicted total mass of the rotorcraft 1 at the target point PtO, comprising the following sub-steps:
  determining 151 the initial total mass of the rotorcraft 1 at take-off, by an individual setting parameters via the interface or by measuring by means of the mass determination device 65;
  estimating 152 a predicted mass of fuel consumed between the take-off point PtD and the target point PtO, according to the fuel consumption law, based on the initial total mass, the flight distance between the take-off point PtD and the target point PtO, and the weather conditions; and
  estimating 155 the predicted total mass of rotorcraft 1 at the target point PtO by subtracting the predicted mass of fuel consumed from the initial total mass.

The first altitude law may also take into account an initial atmospheric pressure and an initial air temperature measured, for example, by the barometer 53 and the thermometer 54, respectively.

The first altitude law may also take into account a predicted atmospheric pressure and a predicted air temperature at the target point PtO. The method may then comprise determining 160 the predicted atmospheric pressure and the predicted air temperature at the target point PtO, comprising the following sub-steps:
  determining 161 the initial atmospheric pressure and the initial temperature at the take-off point PtD; and
  calculating 165 the predicted atmospheric pressure and the predicted temperature, by means of the computer 5, based on the initial atmospheric pressure, the initial temperature, the initial altitude and the final altitude.

To this end, the computer 5 applies known laws of variation of atmospheric pressure and temperature with altitude. These laws may be stored in the memory 51.

Furthermore, during the determination step 180, the computer 5 may also take into account an aerodynamic configuration of the rotorcraft 1 when one or more elements have been added to the rotorcraft with respect to a basic aerodynamic configuration and may modify the aerodynamic behavior of the rotorcraft and/or its performance. By way of example, such an element may be a winch, a stretcher placed outside the aircraft, or a system for protecting an air intake of the thermal power plant 10.

In order to take into account this aerodynamic configuration of the rotorcraft 1, the method may comprise a step 170 of setting parameters of the aerodynamic configuration of the rotorcraft 1. During this step 170 of setting parameters, a crew member may set the parameters of the elements added to the basic aerodynamic configuration of the rotorcraft 1 via the interface, for example. The computer 5 can thus take into account the aerodynamic configuration of the rotorcraft 1, knowing, possibly via information stored in the memory 51, the effects of each of these elements on the determination of the first altitude that can be reached.

Following this step 170 of setting parameters, a weighting coefficient may be applied to the first altitude law, the second altitude law and the fuel consumption law, this weighting coefficient being based on the aerodynamic configuration of the rotorcraft 1. Values of this weighting coefficient associated respectively with different predefined aerodynamic configurations of the rotorcraft 1 may be stored in the memory 51. The weighting coefficient is, for example, less than 1 when the current aerodynamic configuration of the rotorcraft 1 with which it is associated results in a degraded performance of the rotorcraft 1 compared with the performance associated with the basic aerodynamic configuration.

Then, during an estimation step 200, the computer 5 determines a second maximum altitude AM2 that can be reached by the rotorcraft 1 using the thermal power plant 10 and the electrical power plant 20, according to a second altitude law, based on the first maximum altitude AM1, the predicted total mass of the rotorcraft 1 and a predicted amount of intermediate electrical energy available in the electrical energy storage device 15 at the first maximum altitude AM1.

The second altitude law is stored in the memory 51 and may be in the form of charts, tables of values or equations.

The first maximum altitude AM1 and the predicted total mass of the rotorcraft 1 have been previously determined. The predicted amount of intermediate electrical energy may be considered to be equal to the initial amount of electrical energy available in the electrical energy storage device 25 at take-off, if no electrical energy or little electrical energy contained in the electrical energy storage device 25 will be consumed before reaching the first maximum altitude AM1. This is particularly the case if the rotorcraft 1 comprises one or more batteries intended exclusively for supplying power to an on-board electrical network of the rotorcraft 1 or if the rotorcraft 1 comprises a generator supplying power to the on-board electrical network of the rotorcraft 1, the electrical energy storage device 25 being dedicated solely to supplying power to the electric machines 21, 22.

The method may also comprise a step 190 of determining the predicted amount of intermediate electrical energy, comprising the following sub-steps:

determining 191 an initial amount of electrical energy available in the electrical energy storage device 25 at take-off;

estimating 192 a predicted amount of electrical energy consumed between the take-off point PtD and a point situated at the first maximum altitude AM1 between the take-off point PtD and the target point PtO; and estimating 195 the predicted amount of intermediate electrical energy by subtracting the predicted amount of electrical energy consumed from the initial amount of electrical energy.

The electrical energy storage device 25 comprises a management device transmitting a signal carrying information relating to the initial amount of electrical energy to the computer 5.

The predicted amount of electrical energy consumed can be estimated, for example, according to a power consumption law of the rotorcraft 1 in flight and depending on the flight distance.

Furthermore, if the electrical power plant 20 comprises an electric generator 26 or if an electric machine 21, 22 is reversible, the determination step 190 may comprise a step 194 of estimating a predicted amount of electrical energy that may be generated during the flight of the rotorcraft 1 up to the first maximum altitude AM1 by the electric generator 26 or the reversible electric machine 21, 22. This electrical energy that may be generated during the flight can be stored in the electrical energy storage device 25 if this electrical energy storage device 25 is not fully charged with electrical energy. The predicted amount of intermediate electrical energy estimated during the estimation step 195 is then equal to the sum of the predicted amount of electrical energy that may be generated during the flight and the initial amount of electrical energy, minus the predicted amount of electrical energy consumed.

Furthermore, the step 200 of estimating the second maximum altitude AM2 may comprise the following sub-steps:

calculating 201 an additional altitude that can be reached by the rotorcraft 1 using the electrical power plant 20, according to the second altitude law, based on the predicted total mass of the rotorcraft 1 and said predicted amount of intermediate electrical energy; and calculating 202 the second maximum altitude AM2 by adding the first maximum altitude AM1 and the additional altitude.

In this case, the computer 5 can use the second altitude law to calculate this additional altitude that can be reached by supplying power from the electrical power plant 20 above the first maximum altitude AM1.

During a display step 210, the display device 9 displays information relating to a comparison between the final altitude and the second maximum altitude AM2.

The display device 9 may, for example, display a symbol or illuminate a green indicator light when the second maximum altitude AM2 is higher than the final altitude, and may possibly display the values of the final altitude and the second maximum altitude AM2, in order for the pilot of the rotorcraft 1 to know the difference between the final altitude and the second maximum altitude AM2, and therefore the margin available to him or her to reach the target point PtO.

If the final altitude of the target point PtO is higher than the second maximum altitude AM2, the display device 9 may, for example, display another symbol or illuminate a red indicator light during the display step 210. An alert device may also generate an alert 220 when the final altitude is higher than the second maximum altitude AM2. The alert may be visual or audible, for example.

Furthermore, if the final altitude of the target point PtO is higher than the second maximum altitude AM2, the method may comprise additional steps. During an estimation step 203, the computer 5 may estimate a "target" total mass of the rotorcraft 1 allowing the second maximum altitude AM2 to be higher than or equal to the final altitude and, during display 210, the display device 9 then displays information relating to the "target" total mass.

During an estimation step 204, the computer 5 may estimate an additional amount of fuel to be added to the tank 15 allowing the second maximum altitude AM2 to be higher than or equal to the final altitude and, during display 210, the display device 9 then displays information relating to the additional amount of fuel.

During an estimation step 205, the computer 5 can estimate an additional amount of electrical energy to be added to the rotorcraft 1 allowing the second maximum altitude AM2 to be higher than or equal to the final altitude and, during display 210, the display device 9 then displays information relating to the additional amount of electrical energy.

The additional amount of fuel to be added to the tank 15, the "target" total mass of the rotorcraft 1 and/or the additional amount of electrical energy to be added to the rotorcraft 1 may be estimated by the computer 5 using the second altitude law by means of various methods, for example by iteration or by convergence.

The method may also comprise a step 208 of determining an engagement altitude A2 of each electric machine 21, 22, based on the first maximum altitude AM1, the final altitude, the predicted amount of intermediate electrical energy and an engagement margin. At this engagement altitude A2 and above this engagement altitude A2, each electric machine 21, 22 rotates each rotor 3, 4, jointly with the heat engines 11, 12, via the mechanical transmission channel 40, in order to reach the target point PtO.

The method may also comprise a step 207 of determining a pre-engagement altitude A1 of each electric machine 21, 22, based on the first maximum altitude AM1, the final altitude of the target point PtO, the predicted amount of intermediate electrical energy and a pre-engagement margin. The pre-engagement altitude A1 is lower than the engagement altitude A2. Starting from this pre-engagement altitude A1 and until the rotorcraft 1 reaches the engagement altitude A2, each electric machine 21, 22 is started, but does not drive the rotor or rotors 3, 4.

The engagement margin and the pre-engagement margin may depend on a selected flight mode and/or the predicted amount of intermediate electrical energy.

Each electric machine 21, 22 is, for example, connected to the mechanical transmission channel 40 by a free-wheel 27, 28 that makes it possible, starting from the pre-engagement altitude A1, for each electric machine 21, 22 to be started and to have a speed of rotation slightly lower than the speed of rotation of the mechanical transmission channel 40. Each electric machine 21, 22 then transmits no torque or power to the mechanical transmission channel 40 via the free wheels 27, 28.

Starting from the engagement altitude A2, the speed of rotation of each electric machine 21, 22 increases until a speed of rotation is reached allowing each electric machine 21, 22 to transmit torque and mechanical power to the mechanical transmission channel 40 and, consequently, to each rotor 3, 4, via the free wheels 27, 28.

Figure 4:
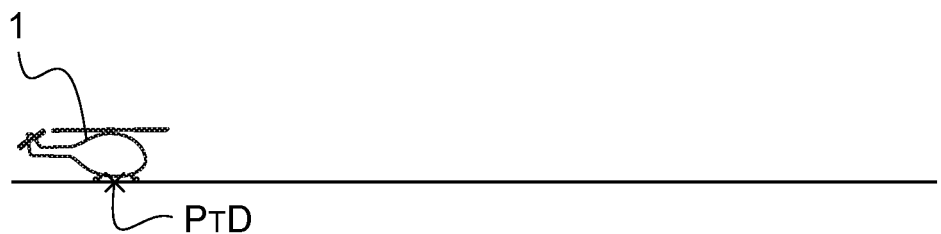
FIG. 4 is a diagram showing the rotorcraft, the target point and the characteristic altitudes of this method.

FIG. 4 shows, in particular, the positions of the pre-engagement A1 and engagement A2 altitudes with respect to the initial and final altitudes.

The method may also comprise a step 300 of implementing a flight of the rotorcraft 1 from the take-off point PtD to the target point PtO. This step 300 of implementing a flight is provided, in particular, with a sub-step 390 of engaging each electric machine 21, 22 at an engagement altitude A2.

The engagement altitude A2 may have been determined before the rotorcraft 1 takes off, during the step 208 of determining an engagement altitude A2.

During the flight, the method may comprise steps of updating the parameters determined before the rotorcraft 1 takes off and the values of which may be liable to change if the flight conditions encountered differ from those forecast or if the rotorcraft 10 has followed a flight path different from the envisaged flight path. The mission can also be modified during flight, for example by adding a waypoint to the flight path, before or after the target point PtO, in order to rescue a person, for example. These updates advantageously take this modification of the path into account.

The step 300 of implementing the flight may therefore comprise the following steps:
- updating 310 the first maximum altitude AM1 that can be reached by the rotorcraft 1;
- updating 320 the predicted amount of intermediate electrical energy;
- updating 330 the second maximum altitude AM2 that can be reached by the rotorcraft 1; and
- updating 340 the engagement altitude A2 of the at least one electric machine 21, 22.

The engagement sub-step 390 may also be carried out during the flight as soon as a monitoring parameter based on the rate of climb of the rotorcraft 1 is lower than an engagement climb rate and an additional engagement condition is validated. The engagement altitude A2 is then equal to the altitude of the rotorcraft 1 for which the monitoring parameter is equal to the engagement climb rate.

The additional engagement condition helps avoid triggering each electric machine 21, 22 too early, during a manoeuvre of the rotorcraft 1 that results in a decrease in this monitoring parameter, and then consuming electrical energy that may be required in order to reach the target point PtO.

To this end, the step 300 of implementing the flight of the rotorcraft 1 may comprise the following sub-steps:

- measuring 350 a rate of climb of the rotorcraft 1 by means of the vertical speed indicator 58;
- calculating 360 a monitoring parameter based on the rate of climb, for example equal to a first derivative of the rate of climb of the rotorcraft 1; and
- engaging 390 each electric machine 21, 22 when the monitoring parameter is lower than an engagement climb rate and when an additional engagement condition is validated.

The additional engagement condition may be validated, for example, when no engagement cancellation action has been performed by a pilot of the rotorcraft 1 for a predetermined first time period during which the monitoring parameter is and remains lower than the engagement climb rate. The step 300 of implementing the flight then comprises a step 370 of displaying information indicating that the monitoring parameter is lower than the engagement climb rate. The cancellation action may be performed via a dedicated switch or via the interface. The pilot of the rotorcraft can also validate the additional engagement condition before the end of the predetermined first time period by using a dedicated switch or the interface.

The additional engagement condition may also be validated when an engagement validation action is performed by the pilot of the rotorcraft 1 after the monitoring parameter has dropped below the engagement climb rate. The step 300 of implementing the flight then also comprises the step 370 of displaying information indicating that the monitoring parameter is lower than the engagement climb rate. The validation action may be performed via a dedicated switch or via the interface.

The additional engagement condition may also be validated when the rotorcraft 1 is situated at an altitude higher than an engagement validation altitude, this engagement validation altitude being equal to the first maximum altitude AM1 multiplied by an engagement coefficient lower than 1.

The step 300 of implementing the flight of the rotorcraft may also comprise a sub-step 380 of pre-engaging each electric machine 21, 22, which can be carried out when the rotorcraft 1 reaches the pre-engagement altitude A1 determined, if applicable, during a determination step 207 before the rotorcraft 1 takes off.

The sub-step 380 of pre-engaging each electric machine 21, 22 may also be carried out when the monitoring parameter is lower than a predetermined pre-engagement climb rate and when an additional pre-engagement condition is validated. The pre-engagement altitude A1 is then equal to the altitude of the rotorcraft 1 for which the monitoring parameter is equal to the pre-engagement climb rate. The pre-engagement climb rate is greater than the engagement climb rate.

The additional pre-engagement condition may be validated, for example, when no pre-engagement cancellation action has been performed by a pilot of the rotorcraft 1 for a predetermined second time period during which the monitoring parameter is and remains lower than the pre-engagement climb rate. The step 300 of implementing the flight then comprises a step 375 of displaying information indicating that the monitoring parameter is lower than the pre-engagement climb rate. The cancellation action may be performed via a dedicated switch or via the interface. The pilot of the rotorcraft can also validate the additional pre-engagement condition before the end of the predetermined second time period by using a dedicated switch or the interface.

The additional pre-engagement condition may also be validated when a pre-engagement validation action is performed by the pilot of the rotorcraft 1 after the monitoring parameter has dropped below the pre-engagement climb rate. The step 300 of implementing the flight then also comprises the step 375 of displaying information indicating that the monitoring parameter is lower than the pre-engagement climb rate. The validation action may be performed via a dedicated switch or via the interface.

The additional pre-engagement condition may also be validated when the rotorcraft 1 is situated at an altitude higher than a pre-engagement validation altitude, this pre-engagement validation altitude being equal to the first maximum altitude AM1 multiplied by a pre-engagement coefficient lower than the engagement coefficient, and consequently lower than 1.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for assisting the piloting of a rotorcraft at high altitudes by supplying mechanical power from an electrical power plant of the rotorcraft, the rotorcraft including:
    at least one rotor;
    a hybrid power plant provided with the electrical power plant and a thermal power plant that are connected to the at least one rotor by a mechanical transmission channel, the thermal power plant comprising at least one heat engine, at least one engine computer of the at least one heat engine and at least one tank containing fuel supplying the at least one heat engine, the electrical power plant comprising at least one electric machine as well as at least one device for controlling the at least one electric machine and at least one electrical energy storage device supplying the at least one electric machine with electrical energy;
    a display device; and
    a computer,
    wherein the method comprises the following steps:
    defining a take-off point of the rotorcraft and its initial altitude;
    defining a target point for the rotorcraft and its final altitude;
    determining a first maximum altitude that can be reached by the rotorcraft using only the thermal power plant, by means of the computer, according to a first altitude law, based on an initial total mass of the rotorcraft before take-off, the initial amount of boarded fuel contained in the at least one tank, an atmospheric pressure and an air temperature, and an ageing state of the at least one heat engine;
    estimating a second maximum altitude that can be reached by the rotorcraft using the thermal power plant and the electrical power plant, by means of the computer, according to a second altitude law, based on the first maximum altitude, the initial total mass of the rotorcraft, and a predicted amount of intermediate electrical energy available in the at least one electrical energy storage device at the first maximum altitude; and
    displaying information relating to a comparison between the final altitude and the second maximum altitude on the display device.

2. The method according to claim 1,
    wherein defining a take-off point of the rotorcraft and its initial altitude comprises:
    defining an initial position of the take-off point of the rotorcraft; and
    determining the initial altitude of the take-off point, from the initial position of the take-off point and a terrain database or a three-dimensional map; and
    defining a target point for the rotorcraft and its final altitude comprises:
    defining a final position of the target point; and
    determining the final altitude of the target point, from the final position of the target point and the terrain database or the three-dimensional map.

3. The method according to claim 1,
    wherein the method comprises determining a predicted atmospheric pressure and a predicted air temperature at the target point, the predicted atmospheric pressure and the predicted air temperature being taken into account for the determination of the first maximum altitude, comprising:
    determining an initial atmospheric pressure and an initial temperature at the take-off point; and
    calculating the predicted atmospheric pressure and the predicted temperature, by means of the computer, based on the initial atmospheric pressure, the initial altitude and the final altitude.

4. The method according to claim 1,
    wherein the method comprises estimating a predicted total mass of the rotorcraft at the target point, using the computer, based on the initial total mass of the rotorcraft before take-off and the flight distance between the take-off point and the target point, estimating of a total mass comprising:
    determining the initial total mass of the rotorcraft;
    estimating a predicted mass of fuel consumed between the take-off point and the target point, based on the initial total mass, the flight distance, and the weather conditions; and
    estimating the predicted total mass of the rotorcraft at the target point by subtracting the predicted mass of fuel consumed from the initial total mass.

5. The method according to claim 1,
    wherein the method comprises determining the predicted amount of intermediate electrical energy available in the at least one electrical energy storage device at the first maximum altitude, the determinating the predicted amount of intermediate electrical energy comprising:
    determining an initial amount of electrical energy available in the at least one electrical energy storage device at take-off, the at least one electrical energy storage device comprising a management device transmitting a signal carrying information relating to the initial amount of electrical energy to the computer;
    estimating a predicted amount of electrical energy consumed between the take-off point and a point situated at the first maximum altitude; and
    estimating the predicted amount of intermediate electrical energy by subtracting the predicted amount of electrical energy consumed from the initial amount of electrical energy.

6. The method according to claim 5,
    wherein determinating the predicted amount of intermediate electrical energy comprises estimating a predicted amount of electrical energy that may be generated during the flight of the rotorcraft up to the first maximum altitude by a generator of the electrical power plant and stored in the at least one electrical energy storage device, the predicted amount of intermediate electrical energy estimated during the step of estimating the predicted amount of intermediate electrical energy being equal to the sum of the predicted amount of electrical energy that may be generated during the flight and the initial amount of electrical energy, minus the predicted amount of electrical energy consumed.

7. The method according to claim 1,
wherein the method comprises setting parameters of an aerodynamic configuration of the rotorcraft, and the determinations of the first maximum altitude and the second maximum altitude take the aerodynamic configuration into account.

8. The method according to claim 1,
wherein the estimation of the second maximum altitude comprises:
calculating an additional altitude that can be reached by the rotorcraft using the electrical power plant according to the second altitude law, based on the initial total mass of the rotorcraft, and the initial amount of electrical energy available in the at least one electrical energy storage device; and
calculating the second maximum altitude by adding the first maximum altitude and the additional altitude.

9. The method according to claim 1,
wherein, if the final altitude of the target point is higher than the second maximum altitude, the method comprises generating an alert.

10. The method according to claim 1,
wherein, if the final altitude of the target point is higher than the second maximum altitude, the method comprises estimating a "target" total mass of the rotorcraft allowing the second maximum altitude to be higher than or equal to the final altitude of the target point and, during displaying information, information relating to the "target" total mass is displayed on the display device.

11. The method according to claim 1,
wherein, if the final altitude of the target point is higher than the second maximum altitude, the method comprises estimating an additional amount of fuel to be added to the at least one tank allowing the second maximum altitude to be higher than or equal to the final altitude of the target point (PtO) and, during displaying information, information relating to the additional amount of fuel is displayed on the display device.

12. The method according to claim 1,
wherein, if the final altitude of the target point is higher than the second maximum altitude, the method comprises estimating an additional amount of electrical energy to be added to the rotorcraft allowing the second maximum altitude to be higher than or equal to the final altitude of the target point and, during displaying information, information relating to the additional amount of electrical energy is displayed on the display device.

13. The method according to claim 1,
wherein the method comprises determining an engagement altitude of the at least one electric machine, based on the first maximum altitude, the final altitude, the predicted amount of intermediate electrical energy and an engagement margin, the at least one electric machine driving the at least one rotor, starting from the engagement altitude.

14. The method according to claim 13,
wherein the engagement margin depends on a selected flight mode and/or the predicted amount of intermediate electrical energy.

15. The method according to claim 13,
wherein the method comprises determining a pre-engagement altitude of the at least one electric machine based on the first maximum altitude, the final altitude of the target point, the predicted amount of intermediate electrical energy and a pre-engagement margin, the at least one electric machine not driving the at least one rotor, the pre-engagement altitude being lower than the engagement altitude, the pre-engagement margin depending on a selected flight mode and/or the predicted amount of intermediate electrical energy.

16. The method according to claim 1,
wherein the method comprises implementing a flight of the rotorcraft to the target point including the engagement of the at least one electric machine at an engagement altitude, the at least one electric machine driving the at least one rotor jointly with the at least one heat engine, starting from the engagement altitude.

17. The method according to claim 16,
wherein implementing a flight comprises the following sub-steps:
updating the first maximum altitude that can be reached by the rotorcraft;
updating the predicted amount of intermediate electrical energy;
updating the second maximum altitude that can be reached by the rotorcraft; and
updating the engagement altitude of the at least one electric machine.

18. The method according to claim 16,
wherein implementing a flight of the rotorcraft comprises measuring a rate of climb of the rotorcraft by means of a dedicated measuring device, calculating a monitoring parameter based on the rate of climb, and the engagement (390) of the at least one electric machine takes place when the monitoring parameter is lower than an engagement climb rate and when an additional engagement condition is validated.

19. The method according to claim 18,
wherein the additional engagement condition is validated when:
no engagement cancellation action has been performed to cancel the engagement by a pilot of the rotorcraft for a predetermined first time period after the monitoring parameter has dropped below the engagement climb rate, the implementation of the flight comprising displaying information indicating that the monitoring parameter is lower than the engagement climb rate; or
an engagement validation action is performed to validate the engagement by the pilot of the rotorcraft after the monitoring parameter has dropped below the engagement climb rate, implementing a flight comprising displaying information indicating that the monitoring parameter is lower than the engagement climb rate; or
the rotorcraft is situated at an altitude higher than a validation altitude for the engagement equal to the first maximum altitude multiplied by an engagement coefficient lower than 1.

20. The method according to claim 18,
wherein implementing a flight of the rotorcraft comprises pre-engaging the at least one electric machine, the pre-engagement of the at least one electric machine taking place when the monitoring parameter is lower than a pre-engagement climb rate and when an additional pre-engagement condition is validated.

21. The method according to claim 20,
wherein the additional pre-engagement condition is validated when:
no pre-engagement cancellation action has been performed to cancel the pre-engagement by a pilot of the rotorcraft for a predetermined time period after the monitoring parameter has dropped below the pre-engagement climb rate, the method comprising displaying information indicating that the monitoring parameter is lower than the pre-engagement climb rate; or
a pre-engagement validation action is performed to validate the pre-engagement by the pilot of the rotorcraft after the monitoring parameter has dropped below the pre-engagement climb rate, the method comprising displaying information indicating that the monitoring parameter is lower than the pre-engagement climb rate; or
the rotorcraft is situated at an altitude higher than a validation altitude for the pre-engagement equal to the first maximum altitude multiplied by a pre-engagement coefficient lower than the engagement coefficient.

22. The method according to claim 1,
wherein the method comprises a step of checking the feasibility of the flight, based on the flight distance, the initial total mass of the rotorcraft before take-off, the initial amount of boarded fuel contained in the tank, a fuel consumption law of the rotorcraft, a mass of a payload or of one or more persons to be embarked on the rotorcraft and/or to be disembarked from the rotorcraft at the target point, the computer determining whether the initial amount of boarded fuel is sufficient to reach the target point and return to the take-off point.

23. A rotorcraft comprising:
at least one rotor;
a hybrid power plant, provided with an electrical power plant and a thermal power plant that are connected to the at least one rotor by a mechanical transmission channel, the thermal power plant comprising at least one heat engine and at least one engine computer of the at least one heat engine, the electrical power plant comprising at least one electric machine, at least one control device for controlling the at least one electric machine and at least one electrical energy storage device supplying the at least one electric machine with electrical energy;
a display device; and
a computer,
wherein the computer is configured to implement the method for assisting piloting according to claim 1.

* * * * *